United States Patent [19]

Goetchius et al.

[11] 3,777,127
[45] Dec. 4, 1973

[54] ANALYZER APPARATUS AND METHOD

[75] Inventors: Ronald J. Goetchius; Michael John Collins, both of Charlotte, N.C.

[73] Assignee: Celanese Corporation, New York, N.Y.

[22] Filed: Apr. 17, 1972

[21] Appl. No.: 244,377

[52] U.S. Cl............ 235/151.3, 68/18 R, 73/61.1 R, 73/159, 235/151.35
[51] Int. Cl............................................. G06g 7/58
[58] Field of Search................... 235/151.1, 151.13, 235/151.3, 151.35; 73/61, 61.1 R, 64, 159–160; 8/151, 158; 68/12 R, 18–19

[56] References Cited
UNITED STATES PATENTS

| | | | |
|---|---|---|---|
| 3,459,506 | 8/1969 | Finucane | 73/159 X |
| 3,690,833 | 9/1972 | Ferrari | 73/61.1 R X |
| 3,564,224 | 2/1971 | Chope | 235/151.35 |
| 3,596,071 | 7/1971 | Doering | 235/151.3 X |
| 3,469,931 | 9/1969 | Boon | 68/18 R X |
| 3,473,175 | 10/1969 | Sieber | 8/158 |
| 3,633,012 | 1/1972 | Wilhelmson et al. | 235/151.3 |

Primary Examiner—Charles E. Atkinson
Assistant Examiner—Jerry Smith
Attorney—Stephen D. Murphy et al.

[57] ABSTRACT

An apparatus for measuring and computing the amount of a soluble material, such as a finish, plasticizer, lubricants and the like, contained on a carrier material, such as plastics, metals, natural and synthetic fibers in the form of tow, yarns or staple fibers. A weighing means measures the weight of a fiber sample and produces a signal representative of the measured weight. A data processor stores the weight signal while the content of the soluble material in the sample is being measured. A sample container is supported by a conveyor means which moves the sample from a loading zone to a testing zone and thereafter to a disposal and washing station. Solvent dispensing means automatically dispense a predetermined volume of a solvent for the soluble material from a source into the sample container. Agitation means agitate the solvent to quickly disperse the soluble material on the sample into solution. A predetermined volume of the resulting solute is removed from the container automatically by solute measuring means and the measured amount of solute is fed to an analyzer which determines the proportion of soluble material in the solute. The analyzer produces a signal proportional to the soluble material weight on the fiber sample. The soluble material weight signal is supplied to a data processor which then computes the percent soluble material on the starting fiber sample.

12 Claims, 5 Drawing Figures

3,777,127

ANALYZER APPARATUS AND METHOD

BACKGROUND OF THE INVENTION

1. Field of the Invention

This invention relates to a means for measuring the amount of a soluble material on an insoluble carrier. In one of its aspects, the invention relates to an apparatus and method for extracting a soluble material from an insoluble carrier with a solvent to form a solute, measuring the concentration of soluble material in the solute, and computing the amount of the soluble material which was initially on the carrier. Numerous applications for such analysis are called for throughout many industries including determinations of the amount of plasticizers in plastics, coatings on films, films on plastics and metals, finish on fibers and the like. For the benefit of clarity and simplicity, the present invention will be described more particularly with reference to fibers.

2. State of the Prior Art

Fibrous materials such as filament yarn, staple, tow and the like, are coated during various stages of processing with small amounts of various chemicals, often called finishes, to aid in processing such as lubricants to reduce the frictional forces between the fibrous materials and stationary parts of the processing machinery. Without the lubrication, the fibrous materials often excessively wear machinery parts and guides and can slow up or stop the processing operation. Additionally, the fibrous materials may fray thereby lowering the quality of the final product. In addition to lubricants, various other finishes are used to obtain temporary or permanent properties in the fibers such as antistats, soil resistance, flame retardancy, water repellency and the like.

The percent of finish on fibrous materials must be closely controlled. A change in such finish level may cause the materials to process differently and result in non-uniformities in the end product. Additionally, fibrous materials are sold by weight and therefore the percent of finish must be accurately determined and maintained in order to properly compute the weight of fibrous material on which the price is based. If the percent of finish is over specification, the customer is buying less fibrous material than he paid for. If the percent of finish is under specification, the manufacturer is getting less money than he should for the material. It is therefore important to maintain the percent of finish on fibrous materials within fixed limits for many reasons.

During some start up operations in which finishes are applied to fibrous materials, it is often necessary to know quickly and accurately the amount of finish which is being applied. Product having off-specification amounts of finish must be discarded or reworked. It is important to know as quickly as possible what the situation is in order to minimize the amount of product which must be discarded.

Presently, the technique for determining finish concentration in the sample is quite time consuming because of the numerous hand operations required by a laboratory technician. The entire procedure which receives the continuous attention of a laboratory technician takes about 1 hour.

SUMMARY OF THE INVENTION

According to the present invention, there is provided an apparatus and method for quickly and accurately measuring the proportion of extractable material on a carrier material. The apparatus carries out substantially the entire process automatically and quickly, thereby eliminating the possibility of human error and with substantial savings in labor cost. The apparatus calculates the proportion or percent of the soluble material extracted from the sample and provides the information in digital print out form. The apparatus also prints out other information such as the sample number, the bone dry sample weight, the weight of finish, an identification of the finish, as well as the percent of finish extracted from the sample.

According to the invention, the apparatus has an extraction station with a sample container for receiving a sample of a carrier material having the soluble material thereon. A predetermined quantity of solvent is dispensed from a source onto the sample in the container for the extraction of the soluble material from the sample to form a solute. Preferably, the solution is vibrated, such as with an ultrasonic probe, to quickly and completely extract the soluble material from the sample. An analyzer is provided for measuring the concentration of the extracted material in the solute and for generating an output signal proportional to the concentration of the soluble material in solute. A predetermined amount of solute is withdrawn from the container and passed to the analyzer which outputs a signal representative of the concentration of the soluble material in the solute. A program controller is operably coupled to the solvent dispenser, agitation means, the solute withdrawing means and to the analyzer for sequentially activating the dispensing means, agitation means, withdrawing means and the analyzer such that the soluble material is automatically dissolved in the solvent, the solute is thereafter automatically withdrawn from the sample container and analyzed for concentration of soluble material. In a case where the vibrator or ultrasonic probe is used, the program controller is also coupled to the vibrator or probe to actuate operation of the same after the solvent is dispensed into the sample container.

Desirably, a computer is coupled to the analyzer for receiving electrical output signals therefrom representative of the concentration of soluble material in the solute. An input signal representative of the initial weight of the sample is also applied to the computer which is capable of calculating the proportion and weight of the soluble material on the sample based on the input electrical signals of the concentration of the material in the solute and the weight of the initial sample.

Desirably, the sample container is fixed to a continuous conveyor which is operated by the program controller to dump the remaining solution and the carrier material from the container after the test solution has been withdrawn for analysis. When the container is in the dumping position, a spray nozzle connected to the source of solvent sprays the container to wash therefrom any remaining traces of the soluble material. Typically, a plurality of containers are fixed to the conveyor so that one sample container can be in use at the extraction station while another sample container is being dumped and washed. When more than two sample containers are provided on the belt, it provides ample opportunity for the washed containers to be dried prior to reuse in the testing procedure.

The computer has means of digitizing the desired information and is coupled to a printer which prints out the desirable information in human readable form.

The input weight signal to the computer is obtained from a means for weighing the sample for generating an electrical output signal reprsentative of the weight of the sample. The weighing means is coupled to the computer so that the electrical weight signal is applied to the computer. A storing means stores the electrical weight signal for use in the computation after the solute has been analyzed.

Further, according to the invention a method is provided for measuring the proportion of a soluble material on a carrier material. The method comprises the steps of automatically and sequentially weighing the sample, generating an electrical signal representative of the weight of the sample, storing the weight signal, dispensing a measured amount of solvent onto the weighed sample, dissolving the soluble material in said solvent to form a solute, withdrawing a predetermined aliquot of solute, analyzing the solute and generating an electrical signal representative of the concentration of the soluble material in the solute. The electrical concentration signal and the stored weight signal are applied to a computer which calculates the proportion of the soluble material originally on the sample. Desirably, the computed proportion of the soluble material is digitized by the computer and the digitized information is applied to a printer which converts and prints out the digitized information in human readable form. In a preferred embodiment of the invention, the soluble material is a lubricant and the carrier material is yarn, tow, or staple.

DESCRIPTION OF THE DRAWINGS

The invention will now be described with reference to the accompanying drawings in which.

DETAILED DESCRIPTION OF THE PREFERRED EMBODIMENT

The invention will be described more particularly with reference to an analyzer for fiber finish lubricants. However, as will be immediately evident from the disclosure herein, the apparatus and method can be used for numerous other extraction analyses.

Figure 1:
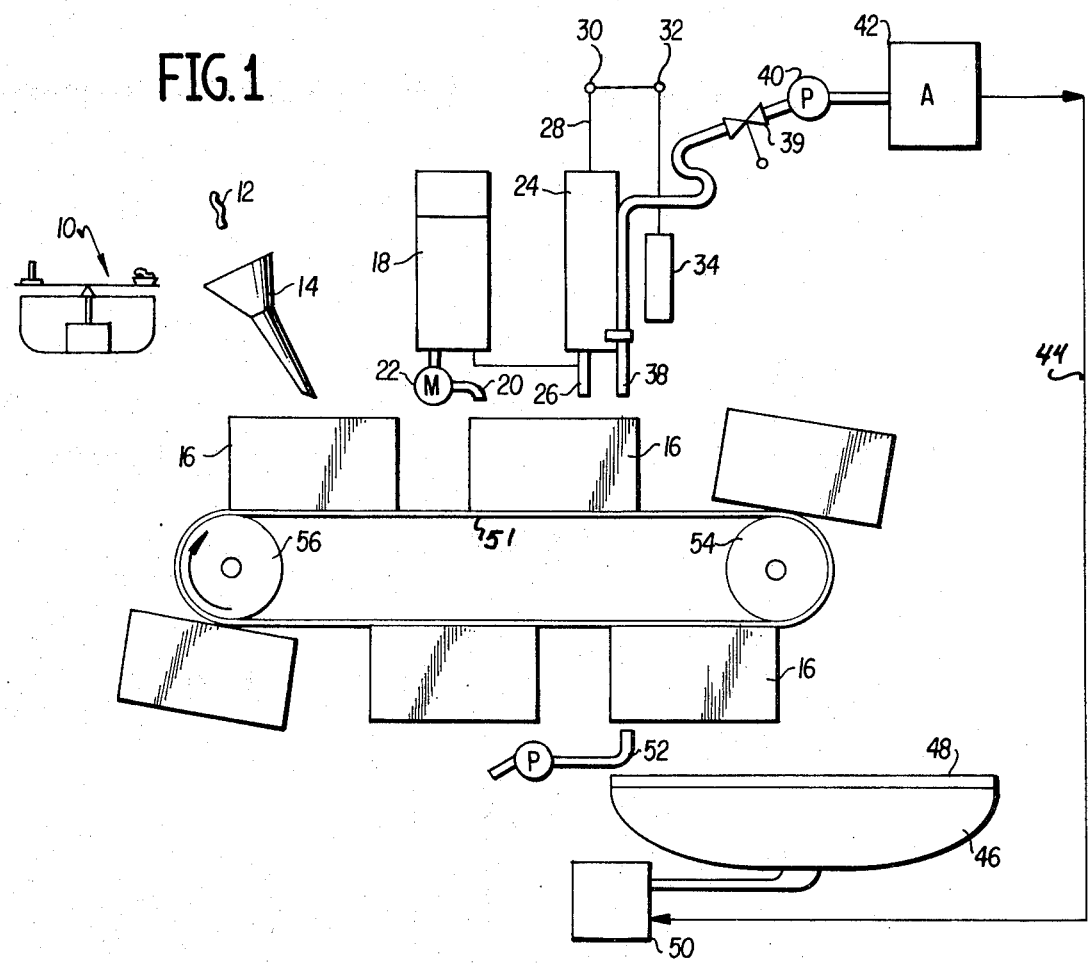
FIG. 1 is a schematic representation of the apparatus according to the invention.

Referring now to the drawings, and to FIG. 1 in particular, there is schematically illustrated a typical preferred embodiment of the present invention. The analyzer includes an electrobalance 10 which automatically weighs the sample and generates an electrical output signal representative of the sample weight. The electrobalance 10 is a well known electrical weighing device. An example of such a device is the Model DTL Multibalance sold by Cahn Division of Ventron Instrument Corp., Paramount, Calif. A sample funnel 14 is provided for reception of sample 12 for guiding the sample into one of a plurality of sample containers 16 fixed on a continuous conveyor belt 51. Sprocket wheels 54 and 56 support and intermittently drive the conveyor belt 51. The sample yarn within the beaker is moved to an extraction station beneath a solvent dispenser 18 having a nozzle 20 and a meter 22 for the dispensing of a measured amount of solvent into beaker 16. Ultrasonic generator 24 has a probe 26 extending downwardly therefrom and is supported above the sample beaker 16. The ultrasonic generator 24 is supported by a wire 28 which is guided around pulleys 30 and 32 to counterweight 34. Ultrasonic generator 24 is raised and lowered on electronic signal to place probe 26 into solvent in container 16 to effect agitation thereof.

The solvent dispenser 18 operates on control to automatically dispense a predetermined quantity of a solvent into the sample container 16 which is positioned beneath the nozzle 20. A preferred dispensing machine is one which uses motor driven syringes to dispense the solvent into the sample container 16. A similar machine is used to subsequently wash sample container 16.

The ultrasonic generator 24 is a well known instrument which is commercially available. An example of such a generator is Model J17A sold by the Branson Sonic Power Company, Danbury, Conn.

Attached to the side of the generator 24 is a sampling tube 38 which is lowered into the sample beaker and raised from the sample beaker along with ultrasonic probe 26. Pump 40 is connected to the line of sampling tube 38 to withdraw a predetermined volume of solute from sample beaker 16 and feed the test solution to infrared analyzer 42. Sampling tube line contains valve 39 which is operated to open the line when it is desirable to feed the solute to analyzer 42. The solute is analyzed for extracted material content in analyzer 42 and then passed through line 44 to a holding tank 50.

Infrared analyzer 42 can be any suitable device which quickly analyzes the extracted material content in the solute and produces an output signal representative of the concentration of such material in the solute. An example of a suitable infrared analyzer is the Audn Fluid Concentration Analyzer sold by the Audn. Corp., Hamburg, N.Y. While for most purposes concentrations of known finishes are being determined, it will be immediately recognized that such analyzer could instead be a gas chromatograph or other chemical analyzer.

After the solute has been taken from container 16 and analyzed, the container is then conveyed by the conveyor belt to a dumping station wherein the sample and the remaining solute is dumped into catch basin 46 having a screen 48 for the separation of the solid residual of the test sample from the solute which solid residue is thereafter discarded. As illustrated in FIG. 1, the conveyor inverts the beaker over the top of the catch basin 46 so that the excess solute and the sample yarn falls out of the beaker. Normally, this dumping operation occurs as the next sample yarn is being moved to the testing position beneath the ultrasonic probe 26 and the solvent nozzle 20. At the dumping station, the dumped container is thereafter washed with a spray of solvent from nozzle 52. Normally, the washing takes place simultaneously with the dispensing of solvent from dispenser 18 which is operatively connected to nozzle 52. The wash solvent flows from the container 16 into the catch basin 46 and from the catch basin 46 to holding tank 50. The solvent in the holding tank can thereafter be purified for removal of the extracted matter and reused. After washing, sample containers 16 are returned to the initial position beneath funnel 14 for reception of another sample. As illustrated in the drawings, a number of sample containers are fixed to the conveyor so that a clean sample container can be used while previously used sample containers are dumped, washed and dried. Desirably, an odd number of sample containers are fixed to the conveyor belt, and the belt is moved through two positions each time a new sample is analyzed. With this arrangement the total length of the conveyor belt can be shortened considerably.

Figure 2:
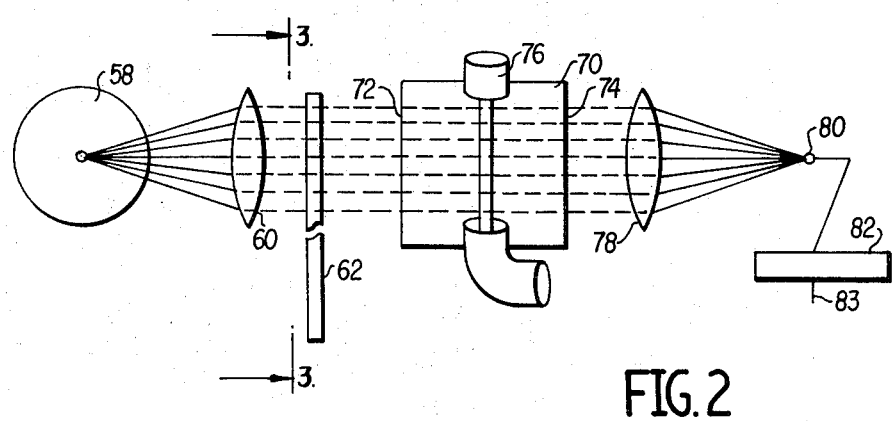
FIG. 2 is a schematic representation of the infrared analyzer used by the apparatus of the invention.
Figure 3:
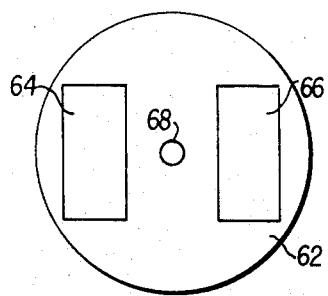
FIG. 3 is a view of a light filter wheel as seen along lines 3—3 of FIG. 2.

Reference is now made to FIGS. 2 and 3 for a discussion of the infrared analyzer. An infrared source 58, such as a light bulb, is positioned in front of a lens 60 to project radiation through filters 64 or 66 on a filter wheel 62 and through a sample cell 70. Openings 72 and 74 are positioned in the sample cell 70 to let the radiation pass therethrough. A lens 78 focuses the radiation passing through the sample cell 70 onto a detector 80. Any light sensitive detector suitable for detecting the wave lengths to be measured can be employed. Desirably, a lead selenide detector is used. A sample holder 76 positions the test solution in the line of the radiation passing through the sample cell 70.

The filter wheel 62 is supported for rotation on a shaft 68 so that the filters 64 and 66 can be alternately positioned in the line of the radiation from the source 58. The filter wheel 62 is rotated continuously by means (not shown) to position the filters in line with the radiation. Each filter transmits only the radiation at one specific wave length. One filter permits passage of a measuring wave length and the other permits passage of a reference wave length. Desirably, the measuring wave length filter permits a wave length of about 3.41 microns to pass therethrough. This band results from the C-H stretching motion and is a characteristic band for many of the lubricants. Desirably, the solvent used is Freon-TF ($CClF_2CCl_2F$) which does not contain a C—H bond to absorb the measuring wave length. Other solvents such as carbon tetrachloride can also be used. Obviously, the solvent used can be one of many available solvents the selection of which is largely determined by solubility coefficients of the material being extracted and the insolubility of the carrier material in such solvent taking into consideration the light wave length absorption characteristics of such solvent. Such selection of other suitable solvents is well known to those skilled in the art. Thus, the amount of light absorbed by the solute in the sample cell 70 when the measuring filter is used is related solely to the amount of lubricant in the solute. Desirably, the reference filter permits passage of the radiation wave length of 2.1 microns where most lubricants show no significant absorption. When measuring other extracted materials in the solute different filters are used which correspond to a suitable reference wave length and measuring wave length. Such filters are readily interchanged as different materials are analyzed. However, it will be recognized that in any given series of analyses, the same materials are normally being analyzed.

The detector 80 generates a signal representative of the amount of radiation received or the transmittance of the solution at the measuring wave length and the reference wave length. The detector applies the signal to an electronic converter 82 having an output terminal 83. The converter 82 converts the input signal from the detector 80 into the log ratio of the transmittance of the two wave lengths. The relationship between the absorbance of the radiation and the transmittance is expressed as follows:

$$A = \log 1/T$$

wherein $A$ is the absorbance and $T$ is the transmittance. From Beer's law, the absorbance can be expressed as follows:

$$A = abc$$

where $a$ = absorption coefficient, $b$ = cell path length, and $c$ = concentration of the absorbing species.

Since the absorption coefficient is constant for any given type of material being analyzed, and the cell path length is a constant of the instrument, the output from the analyzer will be proportional to the concentration of the extracted finish. Further, since the same volume of solvent is used for each extraction, the concentration of the extracted finish is proportional to the weight of the extracted finish. Therefore, the weight of the material on the sample is proportional to the output from the analyzer 42. The proportionality constant can be defined as the correlation factor and can be empirically determined for each material which is measured.

Figure 4:
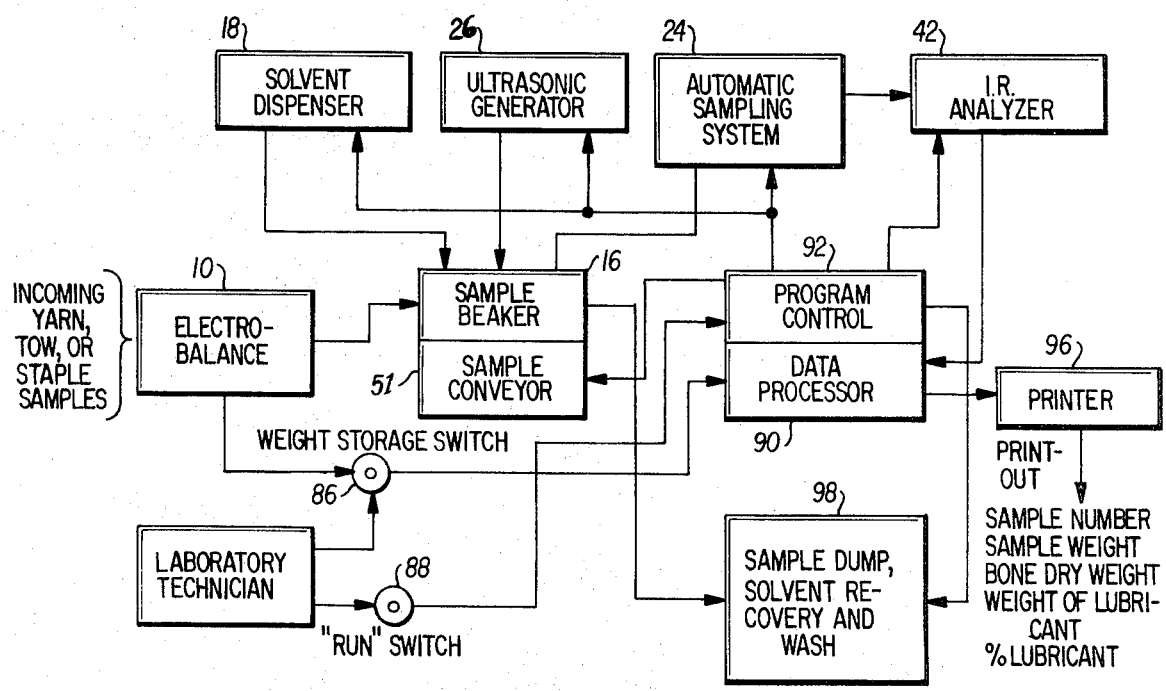
FIG. 4 is a block schematic diagram of the process steps carried out by a preferred apparatus of the present invention.

Reference is now made to FIG. 4 for a description of the overall system and process. In FIG. 4, some of the apparatus parts described hereinbefore are illustrated schematically in block form. For this purpose, like numerals have been used to designate like parts. As stated above, the sample, which is preferably about a 1 gram sample, is placed into the electrobalance 10 which automatically weighs the sample and generates an output signal representative of the weight of the sample. The laboratory technician activates a weight storage switch 86 which applies the weight signal to a computer or data processor 90 which stores the weight signal. The laboratory technician then removes the sample from the electrobalance 10 and transfer it to the sample container 16. The run swtich 88 is then depressed by the laboratory technician to apply an input "run" signal to a program controller 92.

The program controller can be any suitable mechanical, electrical or electromechanical device for activating in sequence the various units of the apparatus. For example, the controller can comprise a cam shaft which activates microswitches at appropriate times to pass control signals to the units of the apparatus.

The sample conveyor 51 is then activated by the program controller 92 to move the sample container to the position beneath the solvent dispenser 18 and the ultrasonic generator 24 and probe 26. The program controller then causes the solvent dispenser to dispense a predetermined quantity of solvent into the sample container 16. Thereafter, the controller 92 signals the lowering of the ultrasonic probe 26 and the sampling tube 38 for immersion into the solvent in the container. The program controller 92 then activates the ultrasonic generator to vibrate and agitate the solvent and sample for a short period of time, for example five seconds, sufficient to completely extract the finish from the filament and disperse the same in the solvent. Surprisingly, it has been discovered that a short period such as about 5 seconds is sufficient to completely extract and dissolve the finish in the solvent. Substantial time is saved with the use of such means of solvation.

The program controller 92 then signals the automatic sampling system to withdraw a predetermined amount of solute from the sample container 16 by opening valve 39 and initiating pump 40. The solute is then passed by the sampling system to infrared analyzer 42. The program controller 92 signals the analyzer to commence its operation for measuring the absorbance of the sample solution by a procedure which has been described above. As set forth hereinbefore, the output from the analyzer 42 is proportional to the weight of the finish on the sample. This signal from the analyzer is applied to the data processor 90 which then computes the weight of the finish on the sample, the dry weight of the sample, and the percent of the finish on the sample. Signals representative of the sample weight, the dry weight of the sample, the weight of the finish, and the percent of finish are applied to a printer 96 which prints out the information. Any suitable printer device can be used. A suitable printer is a Newport Model 800 Digital Printer sold by Newport Laboratories.

The program controller 92 then signals the conveyor to move the sample container to the sample dump, wash and solvent recovery apparatus 98 wherein the sample is dumped and the container washed. The solvent recovery system 98 comprises the catch basin 46, screen 48, and the holding tank 50 (FIG. 1) and has been described above with respect to FIG. 1.

Figure 5:
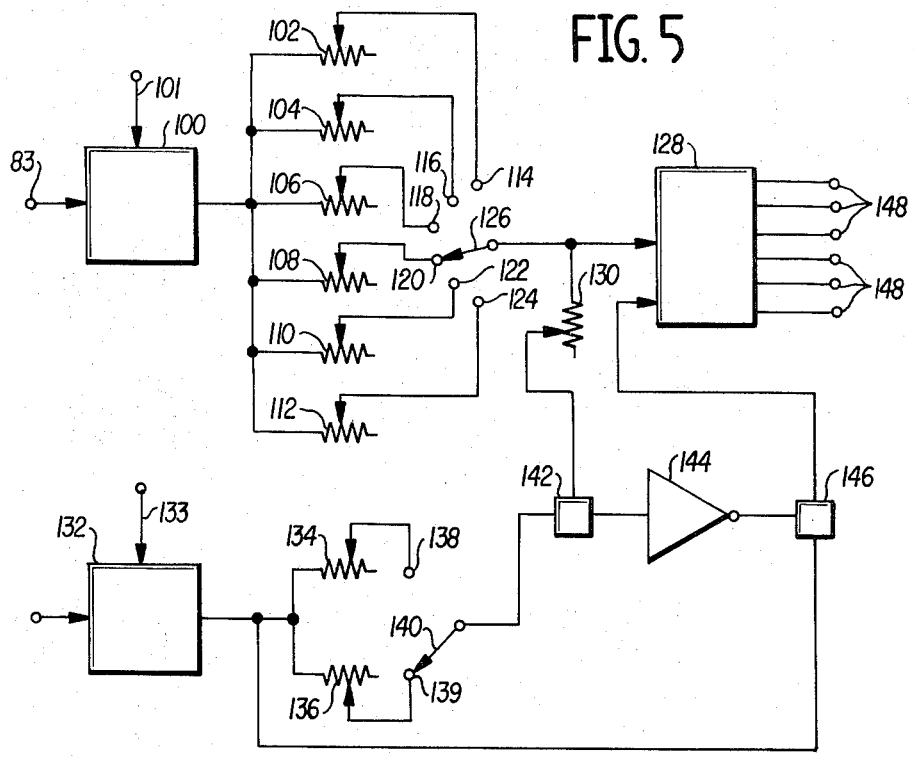
FIG. 5 is a schematic diagram of the data processor used in the invention.

The data processor 90 can be any suitable apparatus for storing the information regarding weight and thereafter computing the percent of solvent on the yarn sample based on input signals representative of the weight of the yarn sample and the absorbance of the solute. An example of a suitable system is illustrated in FIG. 5 to which reference is now made.

The data processing system comprises an analog memory unit 100 which is coupled to a parallel configuration of potentiometers 102, 104, 106, 108, 110 and 112. An input terminal 101 is provided to memory unit 100 to control the storage and release of the signal therefrom. The input terminal 101 is coupled to the program controller 92 by means (not shown). Each of the potentiometers has output contact terminals 114, 116, 118, 120, 122 and 124 which are adapted to be alternately connected by a selector switch 126 to a digital voltmeter 128. The switch 126 is also coupled to a summing point 142 through an attenuating potentiometer 130. Each of the potentiometers 102, 104 106, 108, 110 and 112 is set to apply a correlation factor to the signal from the memory unit 100. Each correlation factor is set to correspond with a particular finish. The operator sets the selector switch to correspond to the type of finish which is on the sample. A second analog unit 132 is coupled to the electrobalance to receive and store the signal representative of the weight. A command input terminal 133 is coupled to the program controller 92 and controls the output from the analog memory unit 132. The output from the memory unit 132 is coupled to a pair of parallel connected potentiometers 134 and 136 having terminals 138 and 139 respectively. The potentiometers 134 and 136 apply a regain factor to the weight signal. The regain factor is related to the amount of moisture in the yarn sample and is empirically determined. A different regain factor is used for each type of sample tested. A selector switch 140 is adapted to couple either of the potentiometers 134 or 136 to the summing point 142 depending on the type of sample under analysis.

The summing point 142 is coupled to an inverter 144, which in turn is coupled to a summing amplifier 146. The memory unit 132 is also electrically coupled to the summing amplifier 146. The output terminal of the summing amplifier 146 is connected to the voltmeter 128 which makes the desirable ratio computation which is to be printed out as percent finish. A plurality of output terminals 148 are provided from the voltmeter 128 to transmit the computed information in digitized form to the printer 96.

The percent of finish can be calculated from the following equation:

$$\% \text{ finish} = [K_N C_S/(W_s - K_N C_s - R_n W_s)] \times 100$$

wherein $K_N$ = the correlation factor for the particular finish analysis: $C_s$ = IR analyzer output, $W_s$ = gross sample weight and $R_N$ = regain factor.

In the equation given above, the numerator is the weight of the finish while the denominator is the bone dry weight of the sample if it is assumed the sample contains a predetermined amount of water. The correlation factor $K_n$ is supplied by the potentiometers 102–112 and is determined empirically for each finish under analysis. The regain factor $R_n$ is dependent on the sample used and is supplied by the regain potentiometers 134 and 136. The manner in which the percent finish is calculated will be described hereinafter with reference to the operation of the data processor.

The data processor works as follows: The analog memory unit 132 receives and retains the signal from the electrobalance 10 until a command signal is applied to input 133 from the program controller 92. After the analysis, the memory 100 receives and retains the output from the analyzer 42 until a command input is applied to terminal 101 from the program controller 92. The signal is then released from the memory, passing through one of the correlation factor potentiometers 102 through 112. The correlation factor potentiometers add a factor which is 100 times the actual correlation factor for the particular finish. This signal is then applied to the digital voltmeter 128. This same signal from the correlation potentiometer is attenuated by the attenuator to reduce the signal to one one-hundredth of its previous value to get the actual correlation factor. The memory 132 receives a command input at terminal 133 from the programmer 92 and applies the weight signal to the summing point 142 through a regain factor potentiometer 134 or 136. The signal from the attenuator 130 is then added to the regain factor weight signal from the potentiometer 136 in the summing point 142. The combined signal is then inverted to produce a negative signal which is then algebraically added to the signal representative of the weight in the summing amplifier 146, the weight signal being applied to the summing amplifier 146 by the memory unit 132. The output signal from the summing amplifier represents the bone dry weight of the sample. This signal is fed to the digital voltmeter 128 which thereupon computes the percent finish by dividing the signal from the summing device 146 into the input signal representative of the solvent weight from the correlation factor potentiometer. The digital voltmeter outputs signals representative of the percent finish, weight of finish, bone dry weight and sample weight. The sample number data is obtained from a digital sample number counter. An example of a suitable digital voltmeter is the Newport Digital Panel Meter, manufactured by Newport Laboratories.

With the invention, many different kinds of yarn, tow, and staple can be measured for the lubricant content quickly and easily. The above described analysis takes place within about 1 minute whereas the previous method required about 1 hour for each sample. The only manual requirements are to place a sample of the yarn, tow or staple to be measured onto the electrobalance, depressing the weight storage switch, placing the sample in the sample container and depressing the "run" button. Everything else, including the calculations, is carried out swiftly and accurately by the inventive apparatus. The use of the analyzer apparatus thus not only decreases the labor requirements but also greatly shortens the time required for analysis and virtually eliminates the possibility of human error.

Numerous modification and adaptations of the apparatus of the invention will be apparent to those skilled in the art and thus it is intended by the claims to cover all such modifications and adaptations as fall within the above spirit and scope of the invention.

What is claimed is:

1. In an apparatus for measuring the proportion of a soluble material on an insoluble carrier sample material comprising:
   a sample weighing means;
   a sample container for receiving said sample;
   a source of solvent for said soluble material;
   means for dispensing a predetermined volume of said solvent into said sample container;
   means for agaitating said sample and solvent in said container to form a solute;
   an analyzer means for measuring the concentration of soluble material in said solute, and for generating an electrical signal representative of said concentration;
   means for withdrawing solute from said container and for passing said solute to an analyzer means;
   a computer means electrically coupled to said analyzer means for receiving as an input said electrical output signal from said analyzer means;
   means for applying an input electrical signal representative of the weight of said sample to said computer;
   said computer having means calculating the proportion of said soluble material on said carrier sample based on said electrical input signals from said analyzer means and said weight input signal;
   said calculating means including means for applying to said input electrical signal of said analyzer means a correlation factor based on the type of soluble material, thereby resulting in a first computer signal representative of the weight of said soluble material on said sample.

2. The apparatus of claim 1 wherein said calculating means further includes a plurality of said correlation factor applying means representing different soluble materials, and switch means for singularly connecting each of said correlation factor applying means with said analyzer means.

3. The apparatus of claim 1 wherein said calculator means further include means for applying to said input signal representative of said weight of said sample a regain factor representative of the initial weight of moisture in said sample, resulting in a second computer signal.

4. The apparatus of claim 3 wherein said calculating means further includes means for adding said first computer signal to said second computer signal to produce a third computer signal; means for inverting said third computer signal; means for adding said inverted third computer signal to said input signal representative of the initial weight of said carrier sample to produce a fourth computer signal; and means for dividing said fourth computer signal into said first computer signal, resulting in an output signal representative of the proportion of the soluble material on carrier sample.

5. The apparatus of claim 4 wherein said dividing means includes a digital meter for producing a digital signal representative of the ratio of said first computer signal to said fourth computer signal.

6. The apparatus of claim 1 wherein said weight applying signal includes means for weighing said sample and for generating an electrical signal representative of the weight of said sample; and said computer means further includes the first means for storing said input weight signal.

7. The apparatus of claim 6 wherein said computer further comprises second means for storing said input electrical signal from said analyzer means and means to synchronize release of said electrical signal from said analyzer means and of said weight input signal from said second and first storing means, respectively.

8. A method for measuring the proportion of a soluble material on a sample of an insoluble carrier material; said method comprising the steps of:
   weighing said sample and generating electrical signal representative of the weight of said sample;
   storing said weight signal;
   dissolving said soluble material in a solvent therefor to form a solute;
   analyzing said solute for concentration of said soluble material in said solute;
   generating an electrical signal representative of the concentration of said soluble material in said solute;
   applying said electrical concentration signal to a computer;
   applying a correlation factor to said electrical concentration signal, said correlation factor being representative of the type of said soluble material, thereby providing a signal representative of the weight of said soluble material on said carrier sample;
   applying said stored weight signal to said computer and therein computing the proportion of said soluble material on said carrier sample.

9. The method of claim 8 comprising digitizing the computed signal representative of the proportion of said soluble material on said sample, and applying said digitized information to a printer, and printing out said digitized information into human readable form.

10. The method of claim 8 wherein said soluble material is a finish and said carrier material is a fiber.

11. The method of claim 10 wherein said finish is a fiber lubricant.

12. The method of claim 10 wherein said fiber is in the form of a yarn, tow or staple.

* * * * *